US007822962B2

(12) United States Patent
Lam

(10) Patent No.: US 7,822,962 B2
(45) Date of Patent: Oct. 26, 2010

(54) APPLICATION SOFTWARE CONFIGURED TO WORK WITH TWO OPERATING SYSTEMS

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 565 days.

(21) Appl. No.: 10/429,645

(22) Filed: May 5, 2003

(65) Prior Publication Data
US 2004/0225876 A1 Nov. 11, 2004

(51) Int. Cl.
*G06F 15/177* (2006.01)
(52) U.S. Cl. ........................................................ 713/2
(58) Field of Classification Search .................. 713/1, 713/2, 100; 726/34–36
See application file for complete search history.

(56) References Cited

U.S. PATENT DOCUMENTS

| | | | |
|---|---|---|---|
| 5,134,580 A * | 7/1992 | Bertram et al. ............... 713/1 |
| 6,148,387 A * | 11/2000 | Galasso et al. ............. 711/203 |
| 6,268,789 B1 * | 7/2001 | Diamant et al. ............ 340/5.74 |
| 6,367,074 B1 * | 4/2002 | Bates et al. ................ 711/170 |
| 6,374,353 B1 * | 4/2002 | Settsu et al. .................. 713/2 |
| 6,401,202 B1 * | 6/2002 | Abgrall ........................ 713/2 |
| 6,405,309 B1 * | 6/2002 | Cheng et al. .................. 713/1 |
| 6,438,750 B1 * | 8/2002 | Anderson .................... 717/178 |
| 6,449,682 B1 * | 9/2002 | Toorians ..................... 711/100 |
| 6,453,469 B1 * | 9/2002 | Jystad ........................ 717/174 |
| 6,457,122 B1 * | 9/2002 | Ramezani ..................... 713/1 |
| 6,473,855 B1 * | 10/2002 | Welder .......................... 713/2 |
| 6,477,642 B1 * | 11/2002 | Lupo ............................. 713/2 |
| 6,486,883 B1 * | 11/2002 | Mathur ....................... 345/568 |
| 6,519,659 B1 * | 2/2003 | Stevens ....................... 710/15 |
| 6,542,160 B1 * | 4/2003 | Abgrall ...................... 345/537 |
| 6,564,318 B1 * | 5/2003 | Gharda et al. ................. 713/2 |
| 6,578,142 B1 * | 6/2003 | Anderson et al. .............. 713/2 |
| 6,622,179 B2 * | 9/2003 | Welder ........................ 710/15 |
| 6,678,812 B1 * | 1/2004 | Begis et al. ................. 711/171 |
| 6,715,043 B1 * | 3/2004 | Stevens ...................... 711/154 |
| 6,734,864 B2 * | 5/2004 | Abgrall ...................... 345/537 |
| 6,757,832 B1 * | 6/2004 | Silverbrook et al. ......... 713/194 |
| 6,791,572 B1 * | 9/2004 | Cloney et al. ............... 345/619 |
| 6,839,836 B2 * | 1/2005 | Cole et al. ..................... 713/2 |
| 6,892,304 B1 * | 5/2005 | Galasso et al. .............. 713/189 |
| 6,931,522 B1 * | 8/2005 | Raghavan et al. .............. 713/2 |
| 2002/0068988 A1 * | 6/2002 | Chan et al. .................. 700/94 |
| 2002/0077713 A1 * | 6/2002 | Du et al. ..................... 700/94 |
| 2003/0060911 A1 * | 3/2003 | Chan et al. .................. 700/94 |
| 2003/0088326 A1 * | 5/2003 | Du et al. ..................... 700/94 |
| 2003/0187775 A1 * | 10/2003 | Du et al. ..................... 705/37 |
| 2003/0188144 A1 * | 10/2003 | Du et al. ...................... 713/1 |

OTHER PUBLICATIONS

Agenda faxed to Examiner from Applicant which was received Nov. 6, 2006.*
Authors Unknown; "The Slackware Linux Project: Zipslack" and "The Slackware Linux Project: Slackware Linux Essentials"; http://web.archive.org/web/20001110094500/www.slackware.com/ . . . ; archived from website published Oct. 14, 2000; total pages provided: 12.*

* cited by examiner

*Primary Examiner*—Thuan N Du

(57) ABSTRACT

An application software is provided to work with two operating systems of a computer. A first mode of the application software is configured to work with the computer before the primary operating system is booted. The second mode of the application software is provided to work under the environment provide by the primary operation system.

28 Claims, 5 Drawing Sheets

APPLICATION SOFTWARE CONFIGURED TO WORK WITH TWO OPERATING SYSTEMS

FIELD OF THE INVENTION

The present invention relates to a method that provides an application software for working with two operating systems of a computer. The application software is configured to work with the computer before the primary operating system is booted.

BACKGROUND OF THE INVENTION

The present invention relates generally to a method allowing a computer to run an application software before the operation system of the computer is booted.

Traditional computer booting sequence starts at running the instructions stored at a BIOS storage device. After the BIOS is booted, the computer is instructed to run the operating system, represented by the term OS. The commonly used OS such as different versions of the Microsoft Windows takes around one to two minutes to boot the computer. When a computer is to be turned off, the OS takes another ten to thirty seconds to turn off the computer. The booting time and shut down time of the OS, although acceptable to most desktop computer working environments, are less tolerable for notebook computer users, especially when the computer is utilized as a real paper notebook, just for retrieving a telephone number, check the time of an appointment, or to drop down some notes.

The definition of the term BIOS, as well known to any person having ordinary skill in the art, refers to the Basic Input/Output System firmware code run by a computer when the computer is first power up and before the control is passed over to an OS. The term OS, well known to a person having ordinary skill in the art, is defined by the Operation System, which manage the hardware resources and software/hardware activities of a computer, after taking over control from a computer BIOS.

It is the objective of this invention to provide a computer system capable of accessing personalized application software prior to the booting process of the computer OS.

SUMMARY OF THE INVENTION

Traditional booting sequence to power up a computer starts with running the instructions stored at a BIOS storage device. Typical BIOS storage device are represented by solid-state non-volatile memory or SRAM memory back up by battery power. A common type of memory used for computer BIOS is flash memory due to the nonvolatile nature of this technology even after power is removed. After the BIOS is booted, the computer is instructed to run the operating system, represented by the term OS. The OS of a computer is provided to set up all the interfacing settings of the hardware and software key components connected to the computer. The OS also defines the default parameters of the computer when power is turned on or when the computer is reset. Technically it is possible to provide a big BIOS for performing many important functions of the OS. However, the cost per mega byte of data of solid-state nonvolatile memory is very expensive as compared with the memory cost of hard disk drives. Accordingly BIOS is usually designed to occupy very small memory size just adequate to store simple programming instructions for the computer to start running the OS. Most of the lengthy start up programs are performed by the OS.

The are many different OS systems available in the market. The most common OS available in the market for personal computer is the Microsoft Windows. Different versions of Windows required one to two minutes of booting time depending on the speed of the hard drive, speed of the processor and the number of supporting hardware and software installed. When a computer is shut down, the OS may take another 10 to 30 seconds to update the data and update the configuration information before closing the running programs. The booting time and shut down time is not causing significant problems to users of desktop computers. This is because the power supply of most desktop computers are left on or turned on/off only once a day. As notebook computers are getting lighter in weight, more and more notebook computers are installed with software servicing daily activities such as appointment schedulers, telephone directories, diary, note pad and many other personalized application programs. All these software servicing the daily activities of a person are collectively termed as personalized application software. Another characteristic of personalized application software is that the information stored, or retrieved are real personalized information. The broader term application software is defined to include any software servicing specific applications, requiring the support of a computer, including but not limiting to word processors and spreadsheets. It should be noted that according to this definition, the definition of application software does not include any software provided mainly to service the computer, such as to test the functions of a computer, virus scan or to configure the settings of a computer. In many actual notebook applications, an user accesses the computer only for simple information previously stored in paper notebooks, such as to retrieve a phone number, check appointments, or to write down some simple messages. The time required for these kinds of application process takes around two to ten seconds. The one to two minutes of booting time acceptable to the application of desktop computers is just too long for many simple notebook applications. It is the objective of this invention to provide a computer system capable of accessing personalized application software prior to the booting process of the computer OS, so that users are able to access data stored in the notebook computer instantly.

The major difficulty in providing speedy access of application software before fully booting a computer is that the OS actually is required to set up the computer before full-featured application software can be run. For example, before an OS is booted, the computer may not be able to response to mouse or touch pad movements. The computer screen is set at the lowest resolution available. Modem and network card access are not available. Other communication ports such as the serial port, parallel port, infrared port and the popular USB port are not accessible. Audio function is not ready. Many of these basic functions are not available, not to mention the advanced features provided by the latest Windows and Apple OS.

Close research of different notebook using habits reveals that over 90 percent of the task performed by the OS, although preferable, are not necessary to perform the personalized applications defined by this research. A lot of features can be compromised in exchange of the convenience of quick access to the personalized applications. In a first application embodiment, a personalized telephone directory program can be provided to work at VGA resolution, a low 8 bit color setting, no sound capability and without accessibility to any external communication ports. The next step is to run the application software before booting the OS.

Different methods had been studied to enable running personalized application software before booting an OS. The first method is to provide a compact application software in a removable diskette. Most BIOS of notebook computer enables the computer to access a boot up diskette before booting the OS. This feature was provided to obtain start up control of the computer in case the OS is corrupted. When the computer is to be normally booted, the diskette containing the application software is removed from the diskette drive. When quick access to the personalized application software is required, the diskette containing the software is inserted into the diskette drive before power is turned on. Several difficulties had been discovered during the research of this direction. Firstly most notebook computers provide only a floppy diskette drive. The 1.44M memory capacity of the floppy diskette is too small for a reasonable application software. This capacity is also too small for storing the personalized data. Secondly, there is an increasing trend that new notebook computers are provided with a CD drive instead of a floppy drive. Even though the capacity of CD drive is high enough for most personalized programs, it is not suitable for this invented application because the personalized data cannot be stored on a regular CD. Although CD R/W is capable of storing user data, it is also not perfect for this application because the CD is easy to be scratched. It is less reliable and difficult to handle as compare with a floppy diskette. In addition, the speed of a CD R/W is too slow especially in writing mode. Higher capacity Zip drive is perfect for this solution. Unfortunately the Zip drives, although popular, was not able to replace the floppy diskette drive to have a widely accepted installed base in notebook computers.

Another approach tried in the research is to modify the BIOS for setting up a removable external miniature drive so that this drive can be accessed before the OS is booted. Size of the miniature drive is important because it will be inconvenient for notebook computer users to carry a bulky external drive just for accessing personalized programs. Accordingly, the larger external drives such as Zip drives and external hard drives are not suitable for this application. Two different kinds of devices are qualified in the search for suitable products to be used to provide a suitable embodiment of the invention. They are the miniature diskette drives that make use of the PCMCIA slot of the notebook computer and the solid-state flash memory devices connected to the communication ports of the computer.

Another method to access a personalized application software before booting an OS is to modify the BIOS such that it is responsive to certain hot keys on the keyboard during power up. When a key is depressed during the power up period, the computer is directed to a personalized application program installed in the hard drive.

Many users and computer manufacturers may feel hesitate to modify content of the BIOS as it is difficult to handle and may cause serious problems very difficult to be fixed. Accordingly another solution is obtained from the research. A referral program is provided in an external boot diskette that directs the computer to run a personalized application program installed in the hard drive.

Alternately the referral program can be stored inside the hard drive of the computer. The BIOS is provided with instructions to access the referral program before starting to boot the primary OS. The referral program may be configured to detect hot keys before or during the booting sequence. The Referral program may also provide a screen to prompt the user to decide which personalized startup application program to be selected or to proceed for booting the primary OS.

The very primitive setup of the computer before booting the OS may be too limiting for some personalized application software. For example, the resolution of the screen may be desirable to be enhanced for better displaying pictures or a spreadsheet. Accordingly the application software or the referral program previously discussed may comprise codes to set up the display screen to provide more colors or higher display resolution. The process of setting up a better working environment is actually part of the job of the full feature primary OS of the computer. Providing some fast set up and configuration task simpler than the primary OS for quickly supporting the personalized application software is defined as the task of a secondary OS. The primary OS is defined as the full-featured OS normally operated by a computer. It should be noted that the computer may comprise only the primary OS if a secondary does not exist. It should also be noted that a consolidated OS may be designed to provide the functions of both the secondary OS and the primary OS; in this case the consolidated OS may also be termed as a primary OS or simply the OS of the computer system.

Another further objective of the invention is to provide a computer system suitable for the user to access the personalized application programs both before the OS booting process and also during the normal operation mode after the OS is booted. For an example, it is desirable to provide an application software that allows an user to input some notes with a primitive notebook application software without booting the OS, and at a later time, using a full feature word processing software to copy or edit the message entered. Since the working environment is very primitive and many supporting devices are not ready before the OS is booted, features of the personalized software offered under this working condition will be difficult to match with the full features working under the OS environment. Different ways had been studied to configure the application software to work under this dual mode environment. The first way is to provide two different application programs, one to work in the pre-OS or secondary OS environment and one to work under the primary OS environment. These different programs may share some common parts, such as the subprograms and the shared data files. Although the two application programs are configured to work under different environments, they can be bundled under one brand or under one package for marketing purposes. The two programs can be packaged as a single software program, comprising a subprogram for use in the pre-OS or secondary OS environments. Assuming the application software working under the primary OS provides n application functions, or objectives, a portion of the software, or a parallel program can be provided to service m applications functions under the pre-OS or secondary OS environment, where m is smaller than n. In most situations, the functions offered in the pre-OS or secondary OS environment is a subset of the full-featured software program, comprising functions selected from the full-featured software working under the primary OS environment. An application software packaged to work under both the pre and post primary OS environments is defined to be a dual mode application software. Dual mode application program may comprise two different application programs, one working in a pre primary OS environment and the other one working in a post primary OS environment. Dual mode application program may also be represented by a single program, capable to adjust itself to work under both the pre and post OS environments. It should be noted that a program working under a simulated pre-OS environment generated in a post OS environment cannot be qualified to be a dual mode application software. This is because the program is actually not design to work with the improved features provided by the post OS environment. A screen may also be provided at the early time of the process to prompt the user if the primary OS is to be booted at a background when the pre OS application software is being utilized.

Other than the functional features, transparency of data file In front of the user is very important. The user is desirable be able to access the data files entered in any of the two application environments. The optimal design is to provide data file common to the programs working in both the pro and post primary OS environments, this defines the situation when no data synchronizing process is required. If this is difficult for some applications, a set of two data files, each design for their respective working environment can be designed. A synchronizing program is then required to update the pair of data files so that the data contents are consistent in the two files. In a preferred embodiment, the pre OS data file is stored in an external memory device such as an external flash memory module or a diskette. The post OS data file is stored in the hard drive. In another preferred embodiment, the pre OS data file comprises the basic, small size data information required by the pre OS application software. The post OS data file comprises more detail extended information, such as facial picture files for supporting a telephone directory program provided by a full-featured application software. Another advantage was discovered when the shared data file is stored in a removable storage device. The storage device can be removed or access prohibited before the computer is connected to the internet such that the confidential data will not be accessible by hackers.

Another objective of the invention is to provide the users multiple startup programs and the choice of which personalized to be launched after running the BIOS. An embodiment of this application is to provide different hot keys each represent a personalized application software to be launched right after completing the BIOS. For example entering the "N" key during the power up process will launch a note pad. Entering the "D" key will launch a directory program. Entering the "W" key will launch a word processing program.

The present invention is also directed to the inventive steps of providing the user a feature to continue booting the primary OS while the user is working on a startup version of the application software. It means the computer continue to boot the OS after the application software is launched. As soon as OS booting sequence is completed, the primary OS will take over the control. A preferred feature offered in the research is for the OS to automatically launch the full version of the application software. The OS may also be configured to automatically switch over the application software from the secondary OS or pre-OS version to the primary OS version. In this process, the primary OS can be configured to comprise a secondary OS portion, which allows the user to instantly launch the reduced version of the application software under the secondary OS environment while the full version of the primary OS is being booted. The feature for the computer to continue booting at the background may be offered as an optional feature. This is because some users may just want to momentarily access the start up application programs and then turn the power off. They may not want to spend the time waiting for the primary OS to power down.

It should be note that the terms "application software" and "applicatio" program quoted throughout the specification carry the same meaning. The novel features of the invention are set forth with particuiarly in the appended claims. The invention will be best understood from the following description when read in conjunction with the accompanying drawings.

BRIEF DESCRIPTION OF DRAWINGS

FIG. 3 is a flow chart illustrating the sequence when a prior art computer is reset or when power is turned on;

DESCRIPTION OF THE PREFERRED EMBODIMENTS

Figure 1:
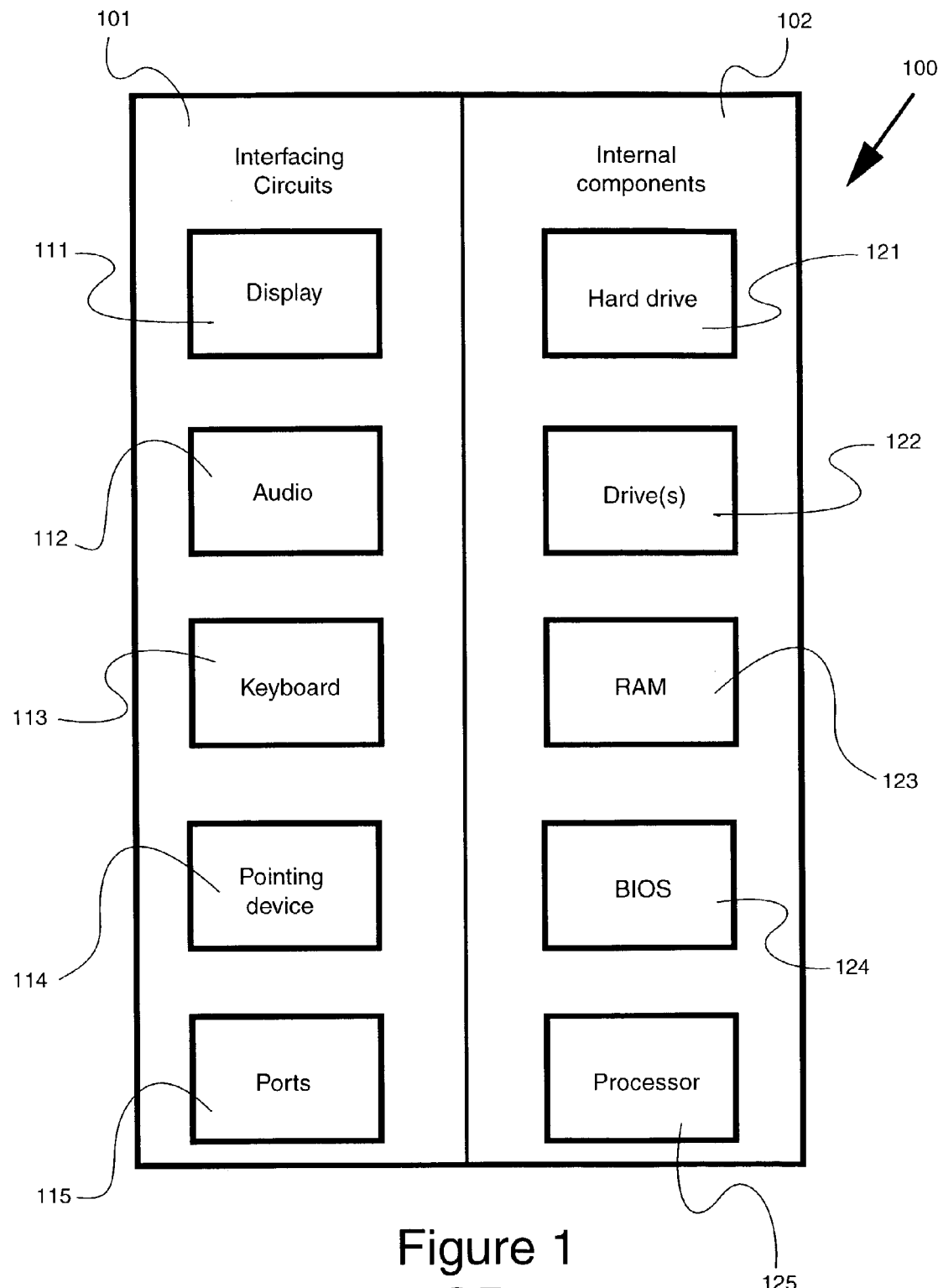
FIG. 1 illustrates the block diagram structure of an embodiment of a notebook computer.

Attention is initially directed to FIG. 1, which depicts the block diagram structure of a prior art personal computer. The computer 100 comprises of interfacing circuits 101 and internal components 102. Interfacing circuits are defined by the components provided to interface between the internal components of the computer with the user or the external environment. Typical interfacing circuits includes the display unit 111, a screen to display information for the user; the audio circuit 112 for providing audio output; the keyboard 113 for entering alpha numeric information; pointing devices 114 represented by mouse, track ball and touch pad sensors. The ports 115 include all different kinds of communication interfaces such as USB port, fire wire port, serial and parallel ports, network port and modem. The internal components 102 of a computer comprise an internal hard drive 121 provided for storing OS, programs and data. Drives 122 are provided to accept external storage media. Typical external media accepted by the drives 122 are magnetic diskettes and optical disks. Some add on flash memory modules are marketed as solid state drives. In addition to the internal hard drive, the computer requires faster internal solid state memory 123 for providing higher speed operation. BIOS is represented by battery back up memory or flash memory storing the instruction set to be run upon power up or resetting the computer. The core of the computer is a high speed processor 125 which is sometime named as a CPU. When the power of the computer is turned on, the processor 125 fetches instructions from the BIOS 124 which setup the primary configuration of the computer. Then the computer is directed to initiate programs stored inside the hard drive 121. The operation system, also commonly referred as the OS stored in the hard drive 121 further set up the hardware and software configurations of the computer. After the OS is booted, application programs stored inside the hard drive 121 can be launched to service the needs of the users. In order to take over the control of the computer just in case a crash occurs, the BIOS 124 may instruct the computer to look at the external drive 122 for initial program before proceeding to launch the OS from the hard drive 121.

Figure 2:
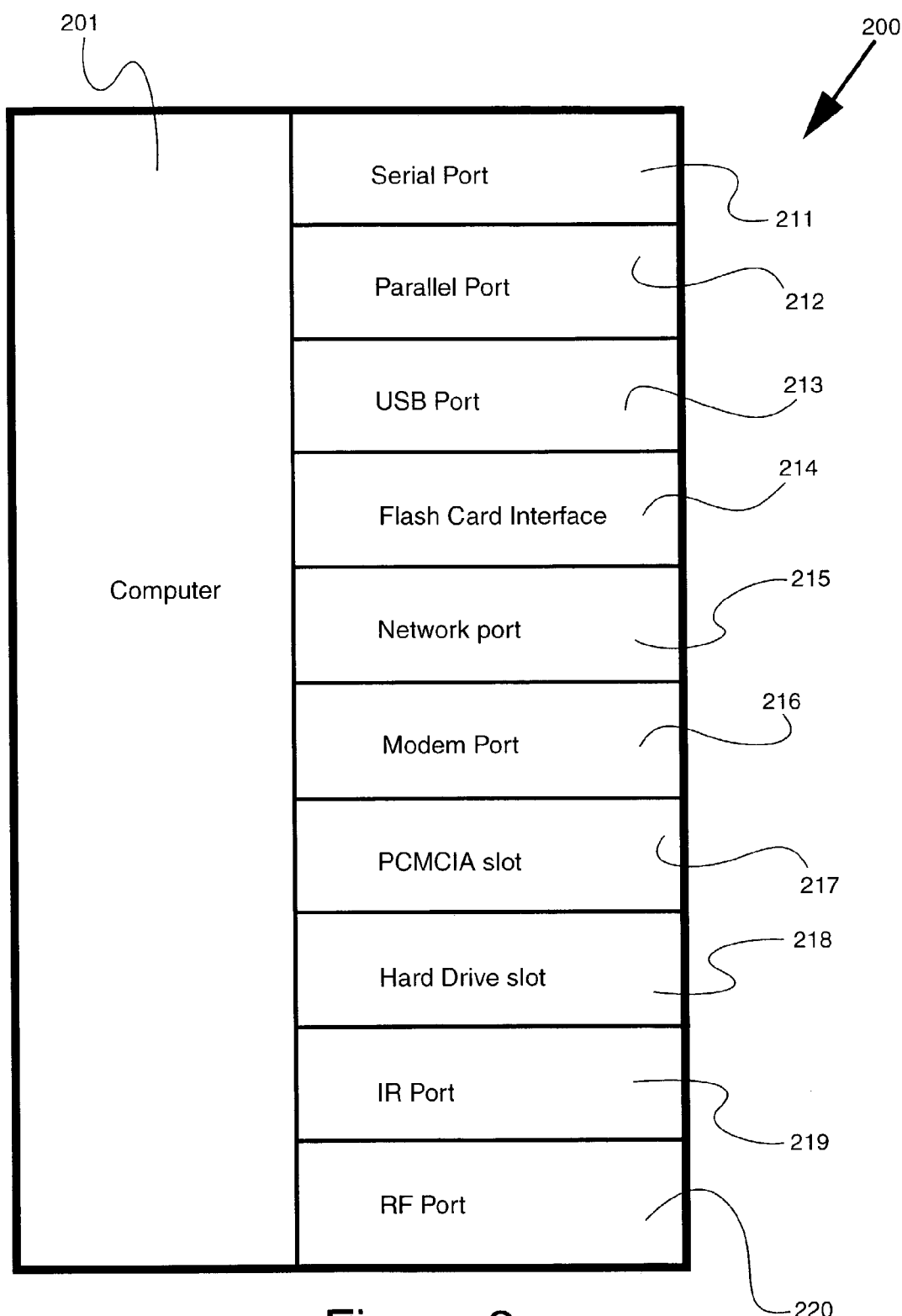
FIG. 2 illustrates the typical ports enabling a computer to communicate with external devices.

FIG. 2 illustrates the communication ports provided to a typical computer. Serial port 211 and parallel port 212 enable the computer to communicate with external devices such as printers. USB port 213 is another universal serial communication interface that provides limited power to the external devices. New computers may also provide interface connector 214 for connection with flash memory modules such as compact flash, smart media or memory stick. Network port 215 and modem port 216 enable the computer to communicate with external network. PCMCIA slot 217 is a standard interface port providing power and high speed interface for notebook computers to connect with miniature slim size devices such as network card or miniature drives. Some desk top computer may provide extra hard drive slot 218 connecting an external hard drive to the computer. IR port 219 and RF port 220 are provided for the computer to communicate with external devices without a cable. Blue tooth and WiFi are common RF standards used for note book computer.

Figure 3:
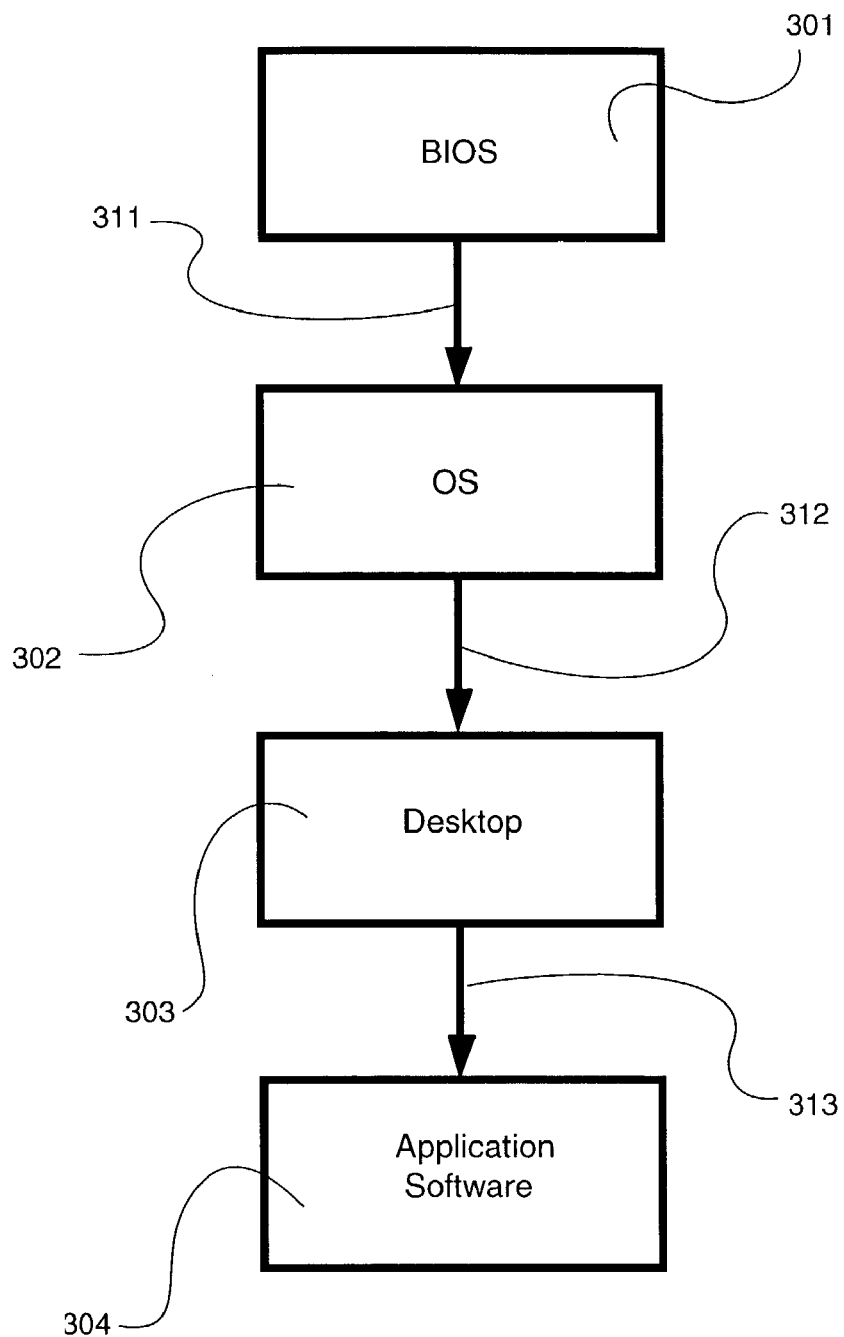

FIG. 3 demonstrates the booting sequence of a typical computer. Programs instructions stored inside the BIOS memory 301 are executed by the CPU when the power of the computer is turned on. After setting up the primitive configurations of the computer such as the video display and the keyboard, the computer starts to boot the operation system 302 which is also referred as the OS of the computer. When Windows or Apple OS are booted, the OS provides a desktop, which enables user to access different application software 304 by clicking the short cut icons displayed on the desktop screen.

Figure 4:
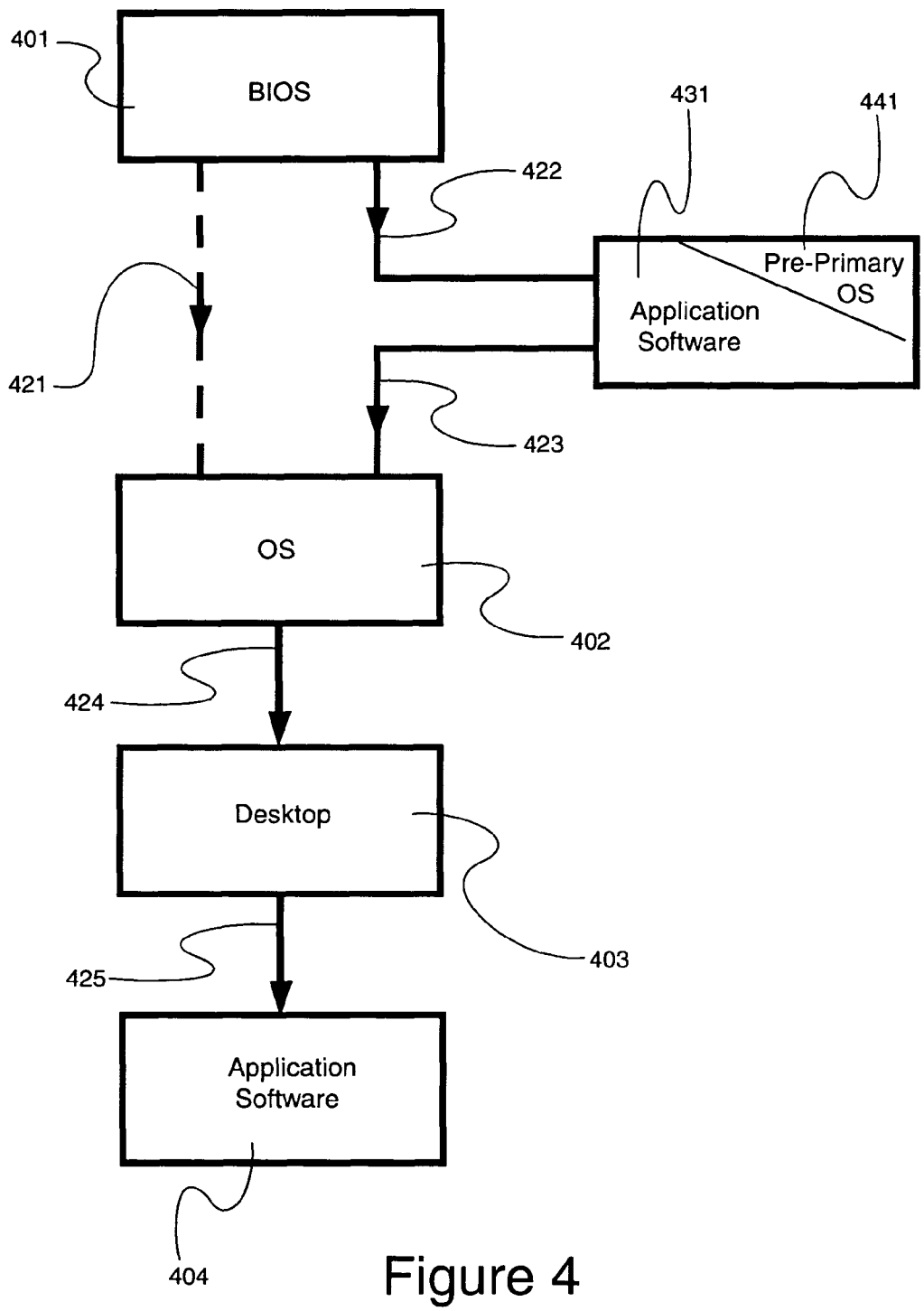
FIG. 4 illustrates the introduction of startup application software into a booting sequence.

Attention is now drawn to FIG. 4, which illustrates the flow chart for a computer to access an application software 431 after executing the instructions stored in the BIOS memory 401. Since the BIOS 401 only provides very primitive setup of the computer, this pre OS environment provides limited features for the pre OS application software 431. Accordingly the application software may include a primitive but improved secondary OS for enriching the support of the application software 431. The mechanism to initiate the path 422 can be achieved by modifying the content of the BIOS, or by providing another initialization program stored on a diskette, which directs the computer to set up the secondary OS or to launch the application software 431 before booting the primary OS 402. When a user is working on the application software 431, the computer may continue to boot the primary OS 402 at the background. After the primary OS is booted, the computer launches the desktop and the full-featured application software 404 for replacing the primitive pre OS version of the application software 431. It should be noted that the path 423 and 421 may be provided as an option because many users may only want to have a brief access 11 to the application program 431 before turning off the computer.

Figure 5:
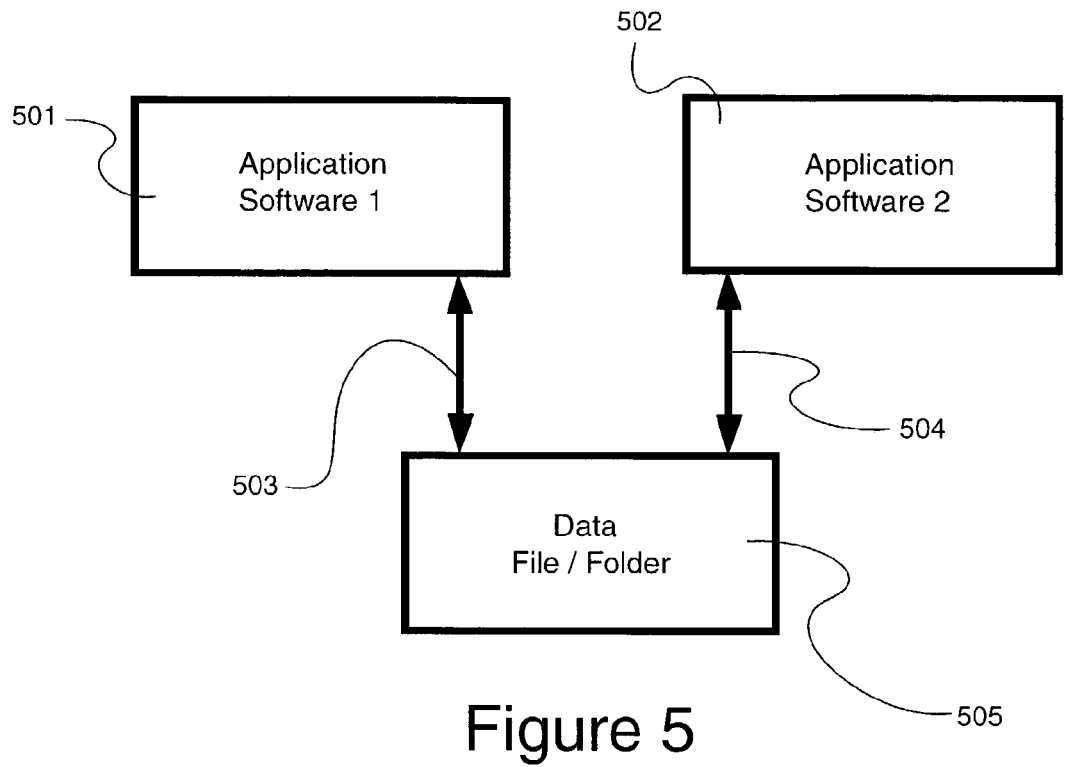
FIG. 5 illustrates one structure of dual mode application software.

The primitive pre OS version of the application program 431 and the full featured application software may be derived from two different programs, or from a packaged software providing services in both the pre and post OS environments. The pre OS application program may be designed to provide some major functions of the full-featured application software 404. In order for the application program 431 to be smoothly transformed over to 404, a dual mode application software comprising both the application programs 431 and 404 is design to provide a common data file 505 as illustrated in FIG. 5. Pre OS application software represented by the block 501 of FIG. 5 and 431 of FIG. 4 is configured to access the data file 505. After the post OS full feature application software 502 of FIG. 5 or 404 of FIG. 4 takes over the control, the full features application software may also obtain access to the common data file 505.

Figure 6:
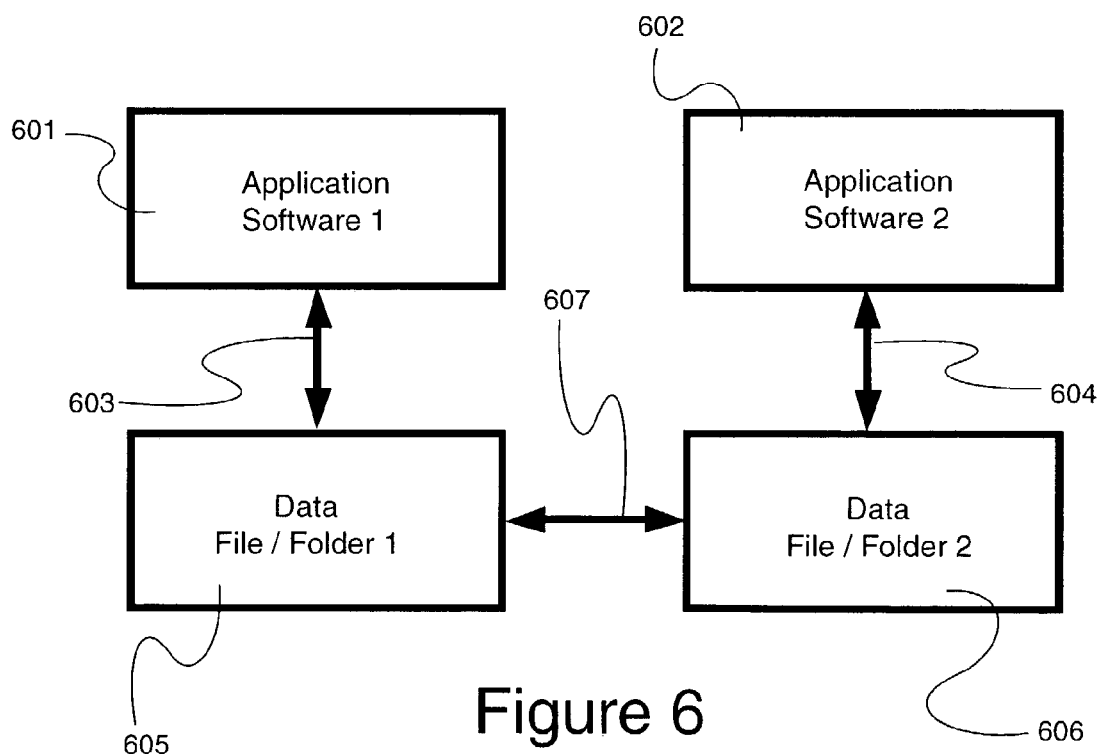
FIG. 6 illustrates another structure of dual mode application software.

Due to technical constrains, sometimes it is preferable to provide different data files to each of the pre and post OS application software as illustrated in FIG. 6. For example the data file 605 managed by the pre OS application software 601 provides only the basic data information for the user. The data file 606 may provide additional imaged data information not available from the file 605, for accessing by the post OS application software. Although the data file 605 and 606 are designed basically to store the similar type of information, the data file 606 may provide extended information about the application less desirable to be accessed by the pre OS application software 601. An example of the extended information to be stored in the file 606 but not in the file 605 are graphical information of large file size. In order to maintain the consistency of data retrieved in both the pre and post OS modes, the data files of the dual mode application software is to be synchronized as shown in the step 607 when the operation is switching from one mode to another.

Another reason to support the structure of FIG. 6 is that sometimes both the pre OS application software and the corresponding data file are stored in an external or removable memory device such as an external flash memory module or a diskette. Since these devices provide limited memory capacity, the data file 605 should be of smaller size as compared with the extended data file 606 stored in the hard drive 121 of FIG. 1.

Although detailed background of the invention have been disclosed, it is recognized that variations and modifications, such as modifying the terms used in the specification, or repackaging the programs in a software package according to marketing needs. It is accordingly intended that all such variations and modifications be encompassed by the appended claims.

What is claimed is:

1. A method for a user to operate a computer comprising the steps of:
   (1) booting a Basic Input/Output System; upon completion of booting said Basic Input/Output System, booting a pre-primary OS for launching a pre-primary OS working environment;
   (2) providing a primary OS for launching a primary OS working environment; and
   (3) running an application program in said pre-primary OS working environment while booting said primary OS.

2. The method of claim 1 further comprising a step enabling said user to decide if said computer is to be withheld from booting said primary OS.

3. The method of claim 1 wherein said computer comprises more than one application programs; said method further comprising a step for said user to select any of said application program to run before launching said pre-primary OS or said primary OS.

4. The method of claim 3 further comprising a step to provide hot keys or an external media for said user to select any of said application programs to be run before launching any of said pre-primary OS or said primary OS.

5. The method of claim 1 further comprising a step enabling said computer to transform from said pre-primary OS working environment into said primary OS working environment.

6. The method of claim 5 wherein said application program is transformed to provide improved features after said pre-primary OS working environment is transformed into said primary OS working environment.

7. The method of claim 1 further comprising a step to provide two or more application programs; and a step enabling said user to select any one of said application programs before starting any of said pre-primary or primary OS.

8. The method of claim 1 wherein said computer is provided an integrated OS comprising said pre-primary OS and said primary OS.

9. The method of claim 1 wherein said application program operates in the pre-primary OS of step 1; and said primary OS is configured to take over the control to run said application program upon the completion of booting said primary OS.

10. The method of claim 1 wherein said application program comprises a first program configured for running in the pre-primary OS of step (1) and a second program for running in the primary OS of step (2).

11. The method of claim 1 further comprising a step to provide a data file to be accessed by a program operated in the pre-primary OS of step (1) and also to be accessed by a program operated in the primary OS of step (2).

12. The method of claim 1 wherein a first application program is provided to run in the pre-primary OS of step (1); said method further comprising a step to run a second application program in the primary OS of step (2); and said first and second application programs are configured to access a common data file without a synchronization process.

13. The method of claim 1 wherein a first application program is configured to run in the pre-primary OS of step (1) and to access a first data file; said method further comprising a step to run a second application program in the primary OS of step (2) and to access a second data file; said method further comprising a step to synchronize the data stored in said first and second data flies.

14. The method of claim 1 wherein said pre-primary OS and said primary OS are configured to coexist with each other for servicing at the same time.

15. A method for providing an application program to operate on a computer having two operating systems comprising the steps of:
  (1) defining n application objectives;
  (2) providing a first program configured to run on a first OS for achieving m application objectives where said m application objectives are a subset of said n application objectives;
  (3) providing a second program configured to run on a second OS for achieving k application objective where said k application objectives are a subset of said n application objectives; and
  (4) installing said first and second programs in a computer wherein said first OS is part of said second OS; and
  (5) providing an external media having a referral program to initiate the selection of an application program to be run before launching said second OS.

16. The method of claim 15 wherein said first and second programs are configured to access data form a common data file.

17. The method of claim 15 wherein each of n, m, and k is a number represented by an integer.

18. The method of claim 15 wherein said first and second programs are configured to access a same data file.

19. The method of claim 15 wherein said first program is configured to access a first data file and said second program is configured to access a second data file;
  wherein said method further comprising a step to synchronize said first and second data files.

20. The method of claim 15 wherein step (5) is configured to work with hot keys of maid computer for selection of an application program to be run.

21. A method for providing an application program to operate on a computer having two operating systems comprising the steps of:
  (1) defining n application objectives;
  (2) providing a first program configured to run on a first OS for achieving m application objectives where said m appilcation objectives are a subset of said n application objectives;
  (3) providing a second program configured to run on a second OS for achieving k application objective where said k application objectives are a subset of said n application objectives; and
  (4) installing said first and second programs in a computer wherein said first OS is part of said second OS;
  (5) providing first memory located inside said computer for storing said first program; and
  (6) providing second memory removable from said computer for storing said second program.

22. The method of claim 21 wherein each of said first and second programs is part of a dual mode application program.

23. The method of claim 21 wherein each of n, m, and k is a number represented by an integer.

24. The method of claim 21 wherein said first and second programs are configured to access a same data file.

25. The method of claim 21 wherein said first program is configured to access a first data file and said second program is configured to access a second data file;
  wherein said method further comprising a step to synchronize said first and second data file.

26. The method of claim 21 wherein said computer is provided with hot keys for selection of an application program to be run.

27. The method of claim 21 wherein said second memory stores a program, which enables a user to select an application program to be run.

28. A computer readable storage medium encoded with an application software; wherein said application software is configured for working with a computer having at least two operating systems represented by a pre-primary OS and a primary OS; wherein said pre-primary OS is configured to be started after completing the booting process of a Basic Input/Output System of said computer; said application software comprises:
  codes enabling said application software to run in said pre-primary OS before said primary OS is booted and
  codes enabling said application software to run on said computer after said primary OS is booted, wherein
  said computer and said application software are configured to allow booting said primary OS while said application software is running under said pre-primary OS.

* * * * *